US007688043B2

(12) United States Patent
Toki et al.

(10) Patent No.: US 7,688,043 B2
(45) Date of Patent: Mar. 30, 2010

(54) REACTIVE-POWER CONTROL APPARATUS AND REACTIVE-POWER COMPENSATOR USING THE SAME

(75) Inventors: Naohiro Toki, Tokyo (JP); Masatoshi Takeda, Tokyo (JP); Yoshiyuki Kono, Tokyo (JP); Koji Temma, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 406 days.

(21) Appl. No.: 11/819,038

(22) Filed: Jun. 25, 2007

(65) Prior Publication Data
US 2008/0157728 A1 Jul. 3, 2008

(30) Foreign Application Priority Data
Aug. 4, 2006 (JP) ............................. 2006-213243

(51) Int. Cl.
G05F 1/70 (2006.01)
(52) U.S. Cl. ..................................... 323/210
(58) Field of Classification Search ................. 323/205, 323/210, 211
See application file for complete search history.

(56) References Cited

U.S. PATENT DOCUMENTS

| 4,755,738 A * | 7/1988 | Shimamura et al. ......... 323/210 |
| 4,857,821 A * | 8/1989 | Takeda ........................ 323/210 |
| 2007/0279016 A1 * | 12/2007 | Toki et al. .................... 323/209 |
| 2008/0157728 A1 * | 7/2008 | Toki et al. .................... 323/210 |
| 2009/0001942 A1 * | 1/2009 | Temma et al. ................ 323/211 |

FOREIGN PATENT DOCUMENTS

| JP | 4-21323 | * | 1/1992 |
| JP | 5-274049 | * | 10/1993 |
| JP | 10-268952 A | | 10/1998 |

* cited by examiner

Primary Examiner—Jeffrey L Sterrett
(74) Attorney, Agent, or Firm—Buchanan Ingersoll & Rooney PC

(57) ABSTRACT

In a conventional reactive-power compensator using a static reactive-power compensator (SVC), there are many cases in which the SVC is operating in a state in which it generates an amount of reactive power equivalent to a large part of its capacity. When an unforeseen large voltage fluctuation occurs in this state, the SVC can not sufficiently generate the amount of reactive power required to mitigate the voltage fluctuation. In some cases, such a voltage fluctuation can not be brought under control. To address this situation, a reactive-power compensator utilizes a reactive-power control apparatus that includes a comparison voltage generator for generating, for a control target voltage and to mitigate voltage fluctuation, a comparison voltage restricted within predetermined limits and obeying a predetermined time-lag characteristic. A differential voltage generator generates a differential voltage that is the difference between the comparison voltage and the control target voltage. A reactive-power control device controls, in response to the differential voltage, control-target reactive power generated by an SVC, at a time-related characteristic faster than the time-lag characteristic for the comparison voltage.

8 Claims, 10 Drawing Sheets

Reactive-power SVC generates (Q SVC)

REACTIVE-POWER CONTROL APPARATUS AND REACTIVE-POWER COMPENSATOR USING THE SAME

BACKGROUND OF THE INVENTION

1. Field of the Invention

The present invention relates to reactive-power control apparatus that control a static reactive-power compensator in which reactive power is generated to mitigate voltage fluctuations in an electric power system, and to reactive-power compensators that utilize the control apparatus.

2. Description of the Related Art

A reactive power compensator utilizes a capacitor, a reactor, and/or a static reactive-power compensator (also referred to as a static VAr compensator, or "SVC"); these are used according to reactive-power requirement. The capacitor or the reactor (commonly referred to as a "reactive power compensation device") is connected to an electric utility-network or power-system by way of a switchgear; because an on/off operation time is required for the switchgear, an instantaneous response thereof can not be realized. On the other hand, an SVC generates leading or lagging reactive power by controlling a switch constructed of semiconductor devices; therefore, the reactive power can be instantaneously controlled.

In a conventional reactive-power compensator, a sum total of the reactive power generated by an SVC and that supplied by a reactive power compensation device is controlled so that the total reactive power becomes equal to the amount required to mitigate voltage fluctuation. (For example, refer to Japanese Patent Laid-Open Publication No. H10-268952.)

Problems to be Solved by the Invention

In the conventional reactive-power compensator using a (busbar-connected) SVC, consideration is not given so much to cope with sudden changes in busbar-voltage fluctuations; in addition, there are many cases in which the SVC is usually operating in a state in which it generates reactive-power amount equivalent to greater part of its capacity. For this reason, when a sudden voltage fluctuation occurs under such a state in which the SVC already generates reactive-power amount equivalent to greater part of its capacity, it can not sufficiently generate the amount of reactive power required so as to mitigate the voltage fluctuation. Thereby, there have been problems in that, in some cases, such a voltage fluctuation can not be brought under control.

The present invention has been directed at solving these problems, and an object of the invention is to provide a reactive-power control apparatus that always enables the SVC to possess an ability to mitigate steep voltage fluctuation, and also reactive-power compensators utilizing the control apparatus.

SUMMARY OF THE INVENTION

In one aspect of the present invention, a reactive-power control apparatus comprises: a comparison voltage generator for generating, for a control target voltage as a target, to mitigate voltage fluctuation, a comparison voltage restricted within predetermined limits and obeying a predetermined time-lag characteristic; a differential voltage generator for generating a differential voltage that is the difference between the comparison voltage and the control target voltage; and a reactive-power control device for controlling, in response to the differential voltage, control-target reactive power generated by a static reactive-power compensator (SVC), at a time-related characteristic faster than the time-lag characteristic for the comparison voltage.

In another aspect of the present invention, a reactive-power compensator comprises: a static reactive-power compensator (SVC), connected to a busbar, for generating reactive power in response to voltage fluctuation at the busbar; a comparison voltage generator for generating, for the voltage at the busbar as a control target voltage, a comparison voltage restricted within predetermined limits and obeying a predetermined time-lag characteristic; a differential voltage generator for generating a differential voltage that is the difference between the comparison voltage and the control target voltage; and a reactive-power control device for controlling, in response to the differential voltage, reactive power generated by the static reactive-power compensator, at a time-related characteristic faster than the time-lag characteristic for the comparison voltage.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described hereunder with reference to the accompanying drawings.

Embodiment 1

Figure 1:
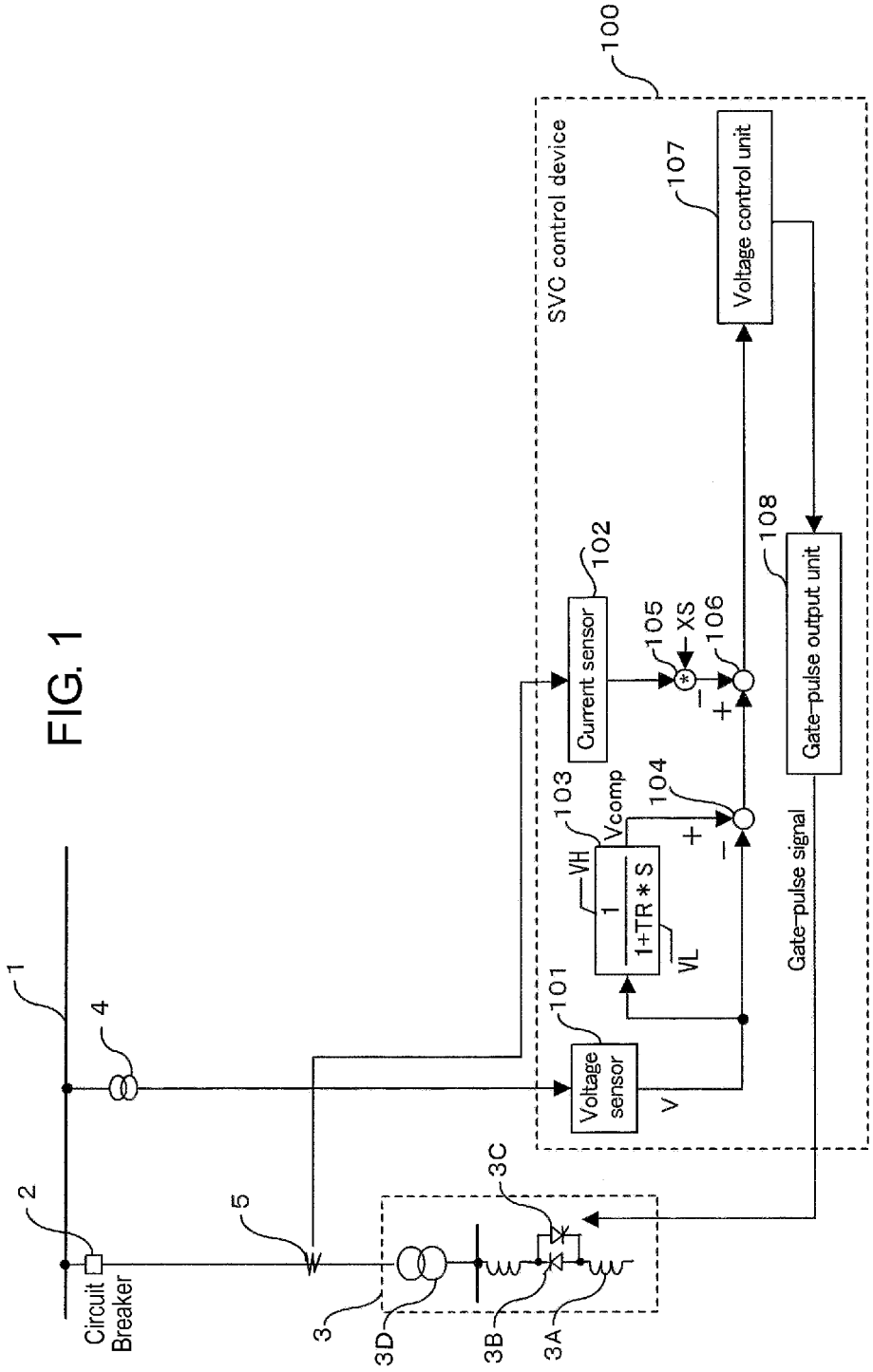
FIG. 1 is a block diagram for explaining a configuration of a reactive-power control apparatus in Embodiment 1 of the present invention.

FIG. 1 is a block diagram for explaining a configuration of a reactive-power control apparatus in Embodiment 1 of the present invention. In FIG. 1, an SVC 3 is connected to a busbar 1 in an electric utility-network or power-system, by way of a circuit breaker 2, where the busbar 1 is a target whose voltage fluctuation is mitigated. The SVC 3 is a thyristor-controlled reactor-type SVC (also referred to as a thyristor controlled reactor, or "TCR"). A reactor 3A and a pair of thyristors 3B and 3C (back-to-back connected in parallel) are connected in series, and they are connected to the busbar 1 by way of a transformer 3D. Reactive power generated by the reactor 3A is controlled by switching on or off the pair of thyristors 3B and 3C.

The SVC 3 is controlled by an SVC control device 100 that is the reactive-power control apparatus. A voltage transformer (VT) 4 is connect to the busbar 1 to measure its voltage, and a current which flows in and out of the SVC 3 is measured by a current transformer (CT) 5. A voltage signal measured by the VT 4 for the busbar 1 and a current signal measured by the CT 5 are both inputted into the SVC control device 100.

The SVC control device 100 is composed of a voltage sensor 101 into which the voltage signal is inputted as an instantaneous value of busbar voltage measured by the VT 4, and from which a voltage signal is outputted as a control target voltage converted into a root-mean-square (rms) value; a current sensor 102 into which the current signal is inputted as an instantaneous value measured by the CT 5, and from which a root-mean-square value is outputted after conversion; a limiter-equipped first-order lag block 103 that is a comparison voltage generator into which the (rms) voltage signal is inputted, and a comparison voltage (Vcomp) is generated following the inputted (rms) voltage so that the comparison voltage is outputted obeying a predetermined time-lag characteristic and is restricted within predetermined limits; a differentiator 104 that is a differential voltage generator that outputs a differential voltage by taking the difference between the output from the limiter-equipped first-order lag block 103 and the (rms) voltage signal; a slope-reactance unit 105 to realize a slope characteristic (as will be described later) that enables a voltage signal to change at a predetermined rate in response to change of reactive power the SVC 3 generates; a differentiator 106 that outputs the amount of difference by subtracting, from the differential voltage, a product of the current-signal information the current sensor 102 outputs with an impedance value XS of the slope-reactance unit 105 (that is, a voltage drop derived in proportion to a value defined by the slope-reactance unit 105); a voltage control unit 107 that inputs the output from the differentiator 106, gives the inputted value a proportional-integral (PI) characteristic, and outputs a voltage target-value; and a gate-pulse output unit 108 that inputs the voltage target-value and generates a gate-pulse signal outputted to gates of the pair of thyristors 3B and 3C of the SVC 3 so that it generates reactive power to let a voltage at the busbar 1 become the voltage target-value. Moreover, the slope-reactance unit 105, the differentiator 106, the voltage control unit 107, and the gate-pulse output unit 108 constitute a reactive-power control device. In addition, the SVC 3, together with the SVC control device 100 that is the reactive-power control apparatus, can be regarded as the reactive power compensator.

A time constant TR determined by a time-lag characteristic of the limiter-equipped first-order lag block 103 is set to be sufficiently larger than a time constant by which a control characteristic of the SVC 3 is determined. Because of a limiter provided, a comparison voltage Vcomp the limiter-equipped first-order lag block 103 outputs is restricted within the limits "VL" and "VH," such that $VL \leqq Vcomp \leqq VH$.

Figure 2:
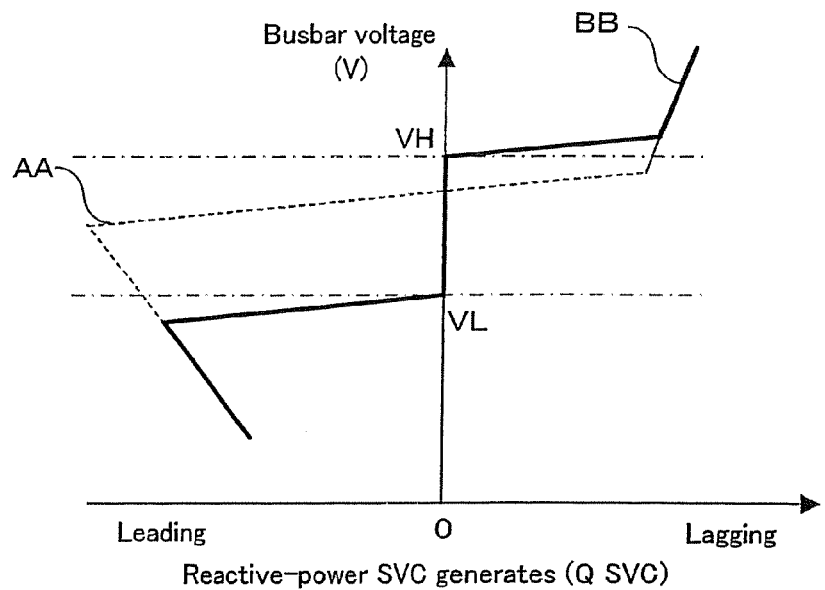
FIG. 2 is a diagram for explaining a relationship between a busbar voltage and reactive power generated by a busbar-connected SVC when the reactive-power control apparatus in Embodiment 1 of the present invention operates.

Next, the operations of the reactive-power control apparatus are explained. FIG. 2 is a diagram for explaining a relationship between a busbar voltage (V) and reactive power (QSVC) generated by the busbar-connected SVC 3 when the reactive-power control apparatus in Embodiment 1 of the present invention operates. A broken line shown in the figure is the dynamic characteristic line "AA"; as far as the magnitude of an absolute value of the reactive-power QSVC is within predetermined limits, a voltage V at the busbar 1 changes, in response to a change of the reactive-power QSVC the SVC 3 generates, according to a slope derived by the impedance value XS of the slope-reactance unit 105. The dynamic characteristic line "AA" is similar to a "voltage versus reactive-power characteristic" a conventional SVC possesses (hereinafter refer to as a "slope characteristic"). In FIG. 2, a dynamic characteristic line is shown in a single (broken) line; however, an infinite number of dynamic characteristic lines exist that satisfy the conditions: the reactive-power QSVC equals zero (QSVC=0), and the voltage V is within the limits "VL" and "VH," such that $VL \leqq V \leqq VH$.

The thick solid-line shown in the figure is the steady-state characteristic line "BB"; as far as a busbar voltage V is larger than "VH" or smaller than "VL," and the magnitude of an absolute value of the reactive-power QSVC is within predetermined limits, the steady-state characteristic line "BB" also possesses the slope characteristic. When the busbar voltage V remains within the limits "VL" and "VH," the reactive-power control apparatus operates to set the reactive-power QSVC to equal zero (namely, QSVC=0), as this will be described later.

Figure 3:
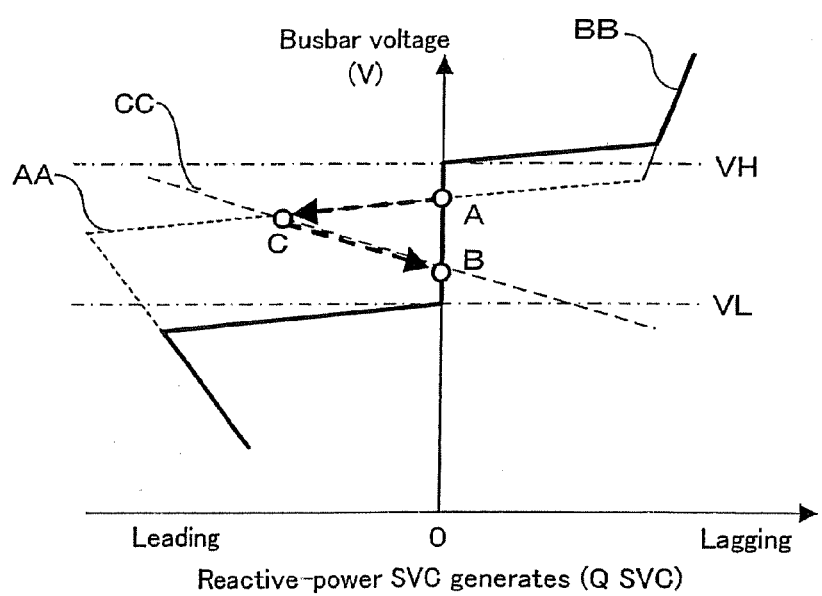
FIG. 3 is a diagram for explaining an operation of the reactive-power control apparatus in Embodiment 1 of the present invention, when a busbar-voltage fluctuation is within predetermined limits.

FIG. 3 is a diagram for explaining an operation of the reactive-power control apparatus in Embodiment 1 of the present invention, when a fluctuation of the busbar voltage V is within predetermined limits. Here, it is presumed that, until a power-system disturbance occurs by which a voltage fluctuation is brought about, there is no change in a power-system's state; and there is also no change in the power-system's state in itself after the disturbance.

The voltage fluctuation presumed here is that, as described below: At the operating point "A" that is in a state before power-system disturbance occurs, a busbar voltage "VA" in the state satisfies conditions of VL<VA<VH, and also QSVC=0; at the operating point "A," power-system disturbance occurs, and a voltage at the busbar 1 is then dropped; the magnitude of the voltage drop is presumably the magnitude in which, if the SVC 3 does not operate, the drop drives the operating point to move from the operating point "A" to the operating point "B" as shown in FIG. 3; and at the operating point "B," a busbar voltage "VB" satisfies conditions of VL<VB<VH. Here, the time constant of this voltage-drop rate change is approximately the same value as the time constant determined by a control characteristic of the SVC 3, and is sufficiently smaller than the time constant TR determined by a time-lag characteristic of the limiter-equipped first-order lag block 103. Because of this, the comparison voltage Vcomp that is the output from the limiter-equipped first-order lag block 103 does not change immediately; therefore, the SVC 3 operates similarly to the case where the reactive-power control apparatus in the present invention does not exist.

Because the SVC 3 operates, the busbar voltage V changes along the dynamic characteristic line "AA" that indicates the slope characteristic. As a characteristic on the power-system side, there is a necessity to hold that a relationship defined between the busbar voltage V and the reactive-power QSVC the SVC 3 generates satisfies the power-system-side characteristic line "CC" shown in FIG. 3. For this reason, when the SVC 3 operates, the operating point moves to the point "C" at which the dynamic characteristic line "AA" intersects with the power-system-side characteristic line "CC."

The comparison voltage Vcomp that is an output from the limiter-equipped first-order lag block 103 approaches the busbar voltage V with the time constant TR. The comparison voltage Vcomp is defined as a voltage that satisfies the condition QSVC=0 on the dynamic characteristic line; when the comparison voltage Vcomp drops, its dynamic characteristic line shifts to a dynamic characteristic line further below. Therefore, the busbar voltage V also drops. Because there is no change on the power-system side, there is a necessity to hold that the relationship defined by the power-system-side characteristic line "CC" must be satisfied just as it is; therefore, the operating point moves toward the point "B" along the power-system-side characteristic line "CC". And when the comparison voltage Vcomp coincides with the busbar voltage V, both of the reactive-power QSVC the SVC 3 generates and the differential voltage become zero; thus, the operating point settles into a state on the operating point "B." In this manner, the operating point moves from the point "A" to the point "C," then to the point "B," according to the voltage drop. Moreover, the operating point moves fast from "A" to "C" according to the time constant determined by a control characteristic of the SVC 3; on the other hand, the operating point moves slowly from "C" to "B" according to the time constant TR determined by a time-lag characteristic of the limiter-equipped first-order lag block 103. Although the reactive-power QSVC changes largely from the operating point "A" to "C," the busbar voltage V does not change so much; for this reason, the busbar voltage V changes slowly from the busbar voltage "VA" to "VB." And then, because at the operating point "B" that is in a steady-state condition, the reactive-power QSVC is zero (QSVC=0); therefore, even if a new and sudden voltage fluctuation occurs in either an increasing or a decreasing manner, the SVC 3 can operate to its maximum capacity, and the sudden voltage fluctuation can thus be brought under control.

Figure 4:
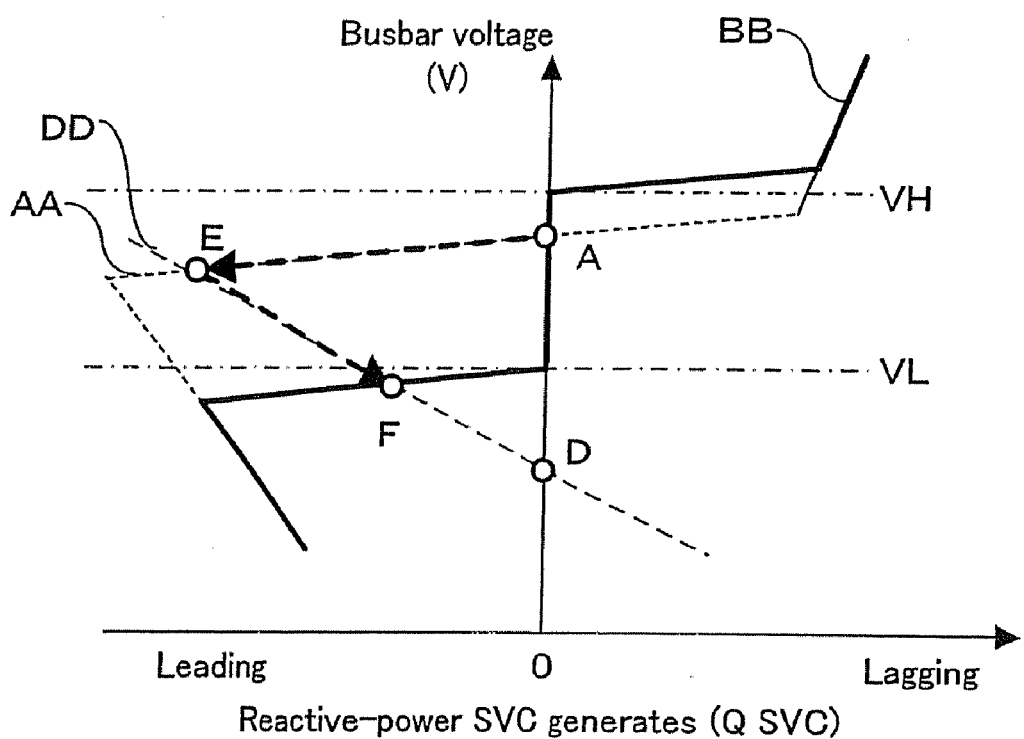
FIG. 4 is a diagram for explaining an operation of the reactive-power control apparatus in Embodiment 1 of the present invention, when a busbar-voltage fluctuation is outside the predetermined limits.

Next, FIG. 4 is a diagram for explaining an operation of the reactive-power control apparatus in Embodiment 1 of the present invention, when a fluctuation of the busbar voltage V is outside the predetermined limits. A voltage drop presumed here has such a magnitude as, if the SVC 3 does not operate, the operating point moves from the point "A" to the point "D" as shown in FIG. 4. The voltage at the operating point "D" is a busbar voltage "VD," which satisfies such a condition as VD<VL. It is also presumed that a change rate of the voltage drop is similar to that shown in FIG. 3.

Immediately after the voltage drop, the operating point moves from the point "A" to the point "E," where an absolute value of the reactive-power QSVC the SVC 3 generates is larger than that (at the point "C") shown in FIG. 3. The comparison voltage Vcomp that is an output from the limiter-equipped first-order lag block 103 approaches the busbar voltage V with the time constant TR. For this reason, the operating point moves slowly toward the point "D" along the power-system-side characteristic line "DD" that passes the point "E." And then, because the comparison voltage Vcomp is restricted within the limits "VL" and "VH," that is, VL≦Vcomp≦VH, when the comparison voltage Vcomp becomes "VL" (Vcomp=VL), the operating point settles into the intersection point "F" of the power-system-side characteristic line "DD" with the steady-state characteristic line "BB." Although the reactive-power QSVC at the operating point "F" is not zero, the value is smaller than that at the operating point "E." Hence, when a sudden voltage drop occurs, the magnitude of voltage fluctuation, at the point "F," that the SVC 3 can bring under control becomes larger than that at the point "E."

In this way, against sudden change in a busbar voltage, the busbar-connected SVC 3 can mitigate a steep voltage fluctuation by operating itself similarly to a conventional SVC. In a steady state, reactive power the SVC 3 outputs can be set to nearly zero. Even when a disturbance or the like occurs in a power system and its voltage suddenly fluctuates, the SVC 3 is always able to operate, and a steep voltage fluctuation can be mitigated.

In addition, a case in which voltage drops have been explained here, a reactive-power control apparatus in Embodiment 1 of the present invention operates approximately similar to a case in which voltage rises. Although a TCR-type SVC is used, as an example, for the explanatory purpose, a thyristor-switched capacitor-type SVC (also referred to as a thyristor switched capacitor, or "TSC"), or an SVC combining both TCR and TSC can also be similarly used.

Moreover, although a first-order lag block is used to generate a comparison voltage, a second-order or higher-order lag block may be used.

Furthermore, the above description can also be applied to the following embodiments.

Embodiment 2

Figure 5:
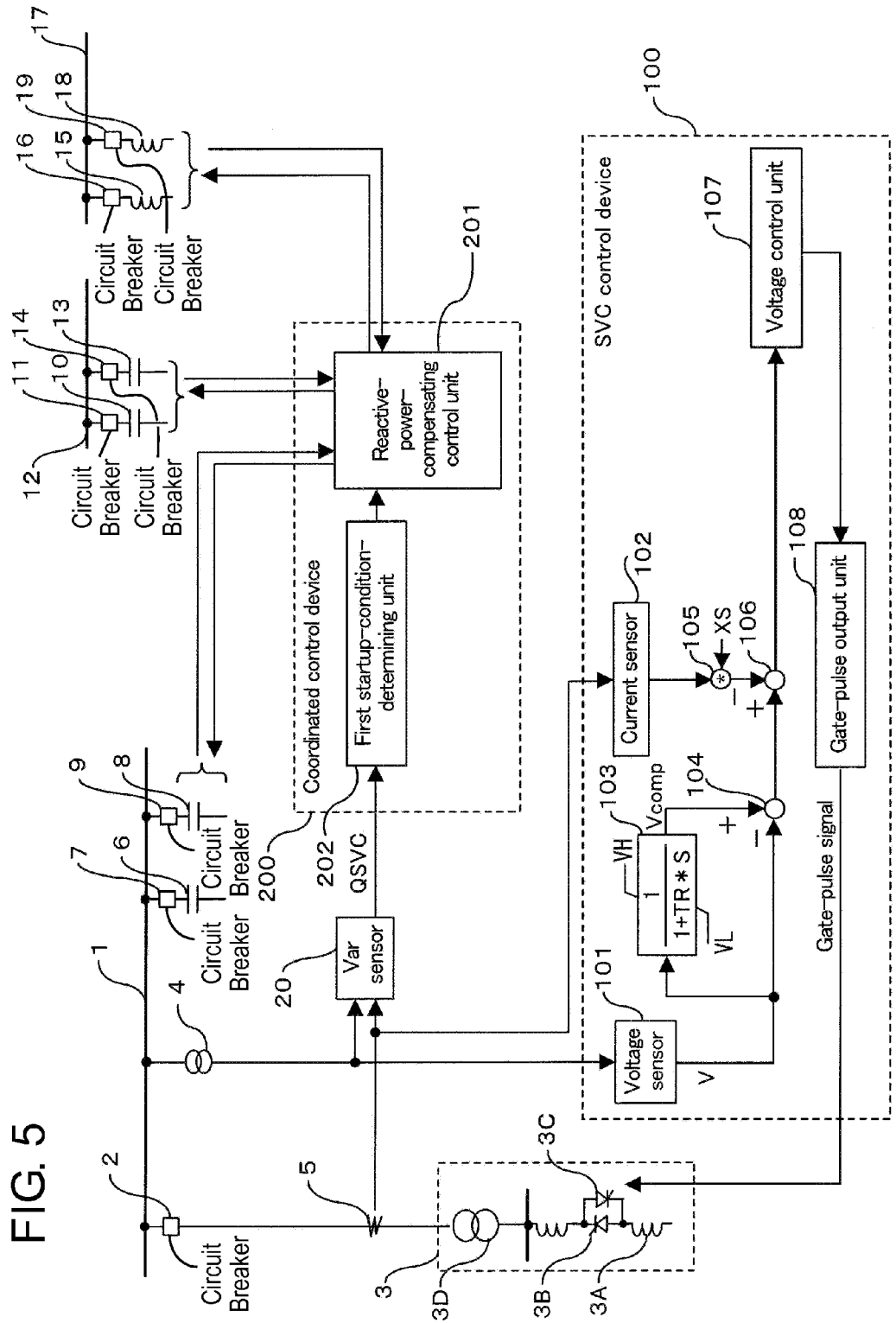
FIG. 5 is a block diagram for explaining a configuration of a reactive-power control apparatus in Embodiment 2 of the present invention.

In Embodiment 1, when voltage fluctuation is large, the reactive-power QSVC the SVC 3 generates in a steady-state can not be brought to zero. In Embodiment 2 of the present invention, a case will be explained in which, after the voltage control by such an SVC 3 similar to that in Embodiment 1 has reached a steady state, a reactive power compensation device is operated by connecting or disconnecting it as a control target so that the reactive power the SVC 3 generates is allocated to the reactive power compensation device. In FIG. 5, a block diagram is shown for explaining a configuration of a reactive-power control apparatus in Embodiment 2. In FIG. 5, the same reference numerals and symbols designate the same items as or items corresponding to those in FIG. 1; thus, their explanation is omitted.

In FIG. 5, a capacitor 6 is connected to the busbar 1 in an electric utility-network or power-system by way of a circuit breaker 7. A capacitor 8 is connected to the same busbar 1 by way of a circuit breaker 9. A capacitor 10 is connected to a busbar 12 by way of a circuit breaker 11. A capacitor 13 is connected to the busbar 12 by way of a circuit breaker 14. In addition, a reactor 15 is connected to a busbar 17 by way of a circuit breaker 16. A reactor 18 is connected to the busbar 17 by way of a circuit breaker 19. Moreover, the busbar 12 and the busbar 17 are those that exist within a predetermined power system, and simultaneously, each or both of them exert influence on the voltage at the busbar 1. The capacitors 6, 8, 10, and 13, and the reactors 15 and 18 each are reactive power compensation devices as the control targets.

In addition to the SVC control device 100, there exists a coordinated control device 200 that is a first reactive-power-compensation device controller that controls operation by connecting or disconnecting each of the reactive power compensation devices. The coordinated control device 200 and the SVC control device 100 constitute the reactive-power control apparatus. In addition, the apparatus further includes a reactive-power or VAr sensor 20 that, with a voltage signal measured by the VT 4 and a current signal measured by the CT 5 being inputted thereinto, computes reactive-power QSVC the SVC 3 generates.

The coordinated control device 200 includes: a reactive-power-compensating control unit 201 that controls operation of connecting or disconnecting each of the reactive power compensation devices (including each selectable capacity, when applicable) that are control targets; and a first startup-condition-determining unit 202 that activates control by the reactive-power-compensating control unit 201 when a predetermined condition using the reactive-power QSVC outputted from the VAr sensor 20 is satisfied. The reactive-power-compensating control unit 201 always receives, as its input, online information, as to whether or not each of the reactive power compensation devices is in an "in-service state," and keeps necessary data to control the reactive power compensation devices (such as the capacity of each reactive power compensation device). Note that, an "in-service" state of a reactive power compensation device means that the circuit breaker corresponding to the device is switched on so that the reactive power compensation device is connected to the power system for service. It is noted that the phrase "disconnecting" means the reactive power compensation device "in-service" is put into "out-of-service" state by operating the corresponding circuit breaker, meanwhile, the phrase "connecting" means the reactive power compensation device "out-of-service" is put into "in-service" state.

The first startup-condition-determining unit 202 determines that the start-up condition is satisfied when a fluctuation of reactive-power QSVC in a latest predetermined time-interval (which is sufficiently larger than the time constant TR) is within predetermined limits, and at the same time, the reactive-power QSVC the SVC 3 generates departs from or deviates out of predetermined limits. Here, the following variables are defined so as to express the predetermined limits within which the reactive-power QSVC should be restricted.

QC1: a predetermined value for the reactive-power QSVC, that is to say, when the reactive power the SVC 3 generates is 'leading' one; and QL1: a predetermined value for the reactive-power QSVC when the reactive power the SVC 3 generates is 'lagging' one.

Here, the 'lagging' reactive power is expressed in a positive value, so that the variables hold such conditions as QC1<0<QL1. When either one of the following equations holds, it is determined that the reactive-power QSVC the SVC 3 generates deviates out of predetermined limits.

$$QSVC > QL1 \qquad \text{Equation (1)}$$

$$QSVC < QC1 \qquad \text{Equation (2)}$$

The condition that "a fluctuation of reactive-power QSVC in a latest predetermined interval-time is within predetermined limits," is a condition to determine that the SVC control device 100 is not operating. Other equivalent conditions may be applied thereto.

The reactive-power-compensating control unit 201 operates to connect or disconnect each of the reactive power compensation devices as a control target, so that the reactive-power QSVC is kept within the limits "QC1" and "QL1" as expressed by following Equation (3). For example, when Equation (1) is held, the reactive-power-compensating control unit 201 controls to increase 'lagging' reactive power by the corresponding reactive power compensation devices being allocated to; on the other hand, when Equation (2) is held, the control unit controls to increase 'leading' reactive power by the corresponding reactive power compensation devices being allocated to.

$$QC1 \leqq QSVC \leqq QL1 \qquad \text{Equation (3)}$$

Figure 6:
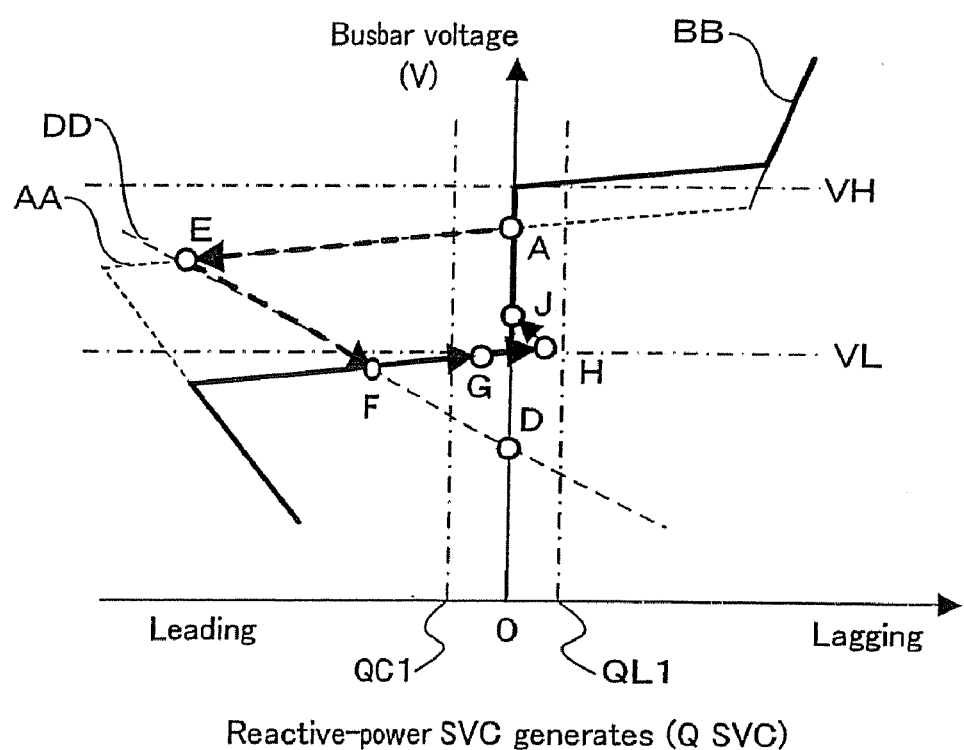
FIG. 6 is a diagram for explaining an operation of the reactive-power control apparatus in Embodiment 2 of the present invention.

Next, the operations of the reactive-power control apparatus are explained. In FIG. 6, a diagram is shown for explaining a relationship between a busbar voltage (V) and reactive power (QSVC) the busbar-connected SVC 3 generates when the reactive-power control apparatus in Embodiment 2 of the present invention operates. It is presumed that the magnitude of voltage drop is the same as the one in FIG. 4. Operation until the operating point moves from the point "A" to "E, then to "F" is the same as that described in Embodiment 1. Because at the operating point "F," Equation (2) is held, when a predetermined time passes after the operating point has settled into the point "F," the first startup-condition-determining unit 202 determines that start-up condition is satisfied; therefore, the reactive-power-compensating control unit 201 is activated. When the reactive-power-compensating control unit 201 starts operating (i.e., by controlling corresponding reactive power compensation devices), the operating point moves to the point "G" where Equation (3) is held. Moreover, when the operating point moves to the point "H" where the busbar voltage V reaches within the limits "VL" and "VH" by controlling the corresponding reactive power compensation devices, the SVC control device 100 operates to bring the reactive-power QSVC becomes zero (QSVC=0), so that the operating point moves from the point "H" to the point "J."

The reactive-power-compensating control unit 201 operates to select and control the corresponding reactive power compensation devices so that Equation (3) is held according to the deviated amount of reactive-power QSVC, i.e., to its extent if it is deviating from either of the limits "QC1" or "QL1" expressed by Equation (3). When a plurality of operation patterns exists by which control-target reactive power compensation devices that hold Equation (3) are operated, a predetermined criterion is applied to determination of reactive power compensation devices to be selectively operated. When any of the control operations for the control-target reactive power compensation devices does not hold Equation (3), a determination of selectively operating reactive power compensation devices is made so that the amount of deviation from the limits "QC1" or "QL1" expressed by Equation (3) becomes as small as possible.

When one of the operation patterns is determined for controlling the reactive-power-compensating control unit 201 that operates the control-target reactive power compensation devices, the following conditions are considered as a predetermined determination criterion, for example:

(The conditions to be considered in determining the operation patterns for control-target reactive power compensation devices.)

(a) An order of priority is determined for busbars the control-target reactive power compensation devices are connected; and then, the priority is given to operating selected reactive power compensation devices connected to those busbars with higher orders of priority. For example, in the system configuration in FIG. 5, priority is given to the busbar 1, the busbar 12, and then to the busbar 17 in that order.

(b) When reactive power compensation devices are connected to the same busbar, priority is given to operating capacitors over reactors. For example, when both connecting capacitors and disconnecting reactors are possible as an operation, priority is given to connecting capacitors over disconnecting reactors.

(c) Priority is given to operating the reactive power compensation devices having smaller capacity.

(d) When the capacities of control-target reactive power compensation devices are approximately the same among them, each of the selected reactive power compensation devices is operated so that each device is connected approximately at the equal frequency to one another.

Moreover, the above conditions are, strictly speaking, examples only; hence, other conditions than these described above may be applied for determination. For example, after having considered all the possible operation patterns, it may be possible to determine that the number of the selected reactive power compensation devices is held at a minimum.

In this way, in Embodiment 2 of the present invention, after a change of reactive power the SVC 3 generates has settled, a reactive power compensation device (including its selectable capacity) is controlled so that the reactive power the SVC 3 generates approaches zero. Therefore, in a steady state, there will be a few cases in which the reactive power the SVC 3 generates can not be brought to approach zero or the value near zero. Thus, it may be possible to obtain an effect of always enhancing voltage maintaining functions against disturbance in the power system, and the effect is larger than that in Embodiment 1.

Embodiment 3

Figure 7:
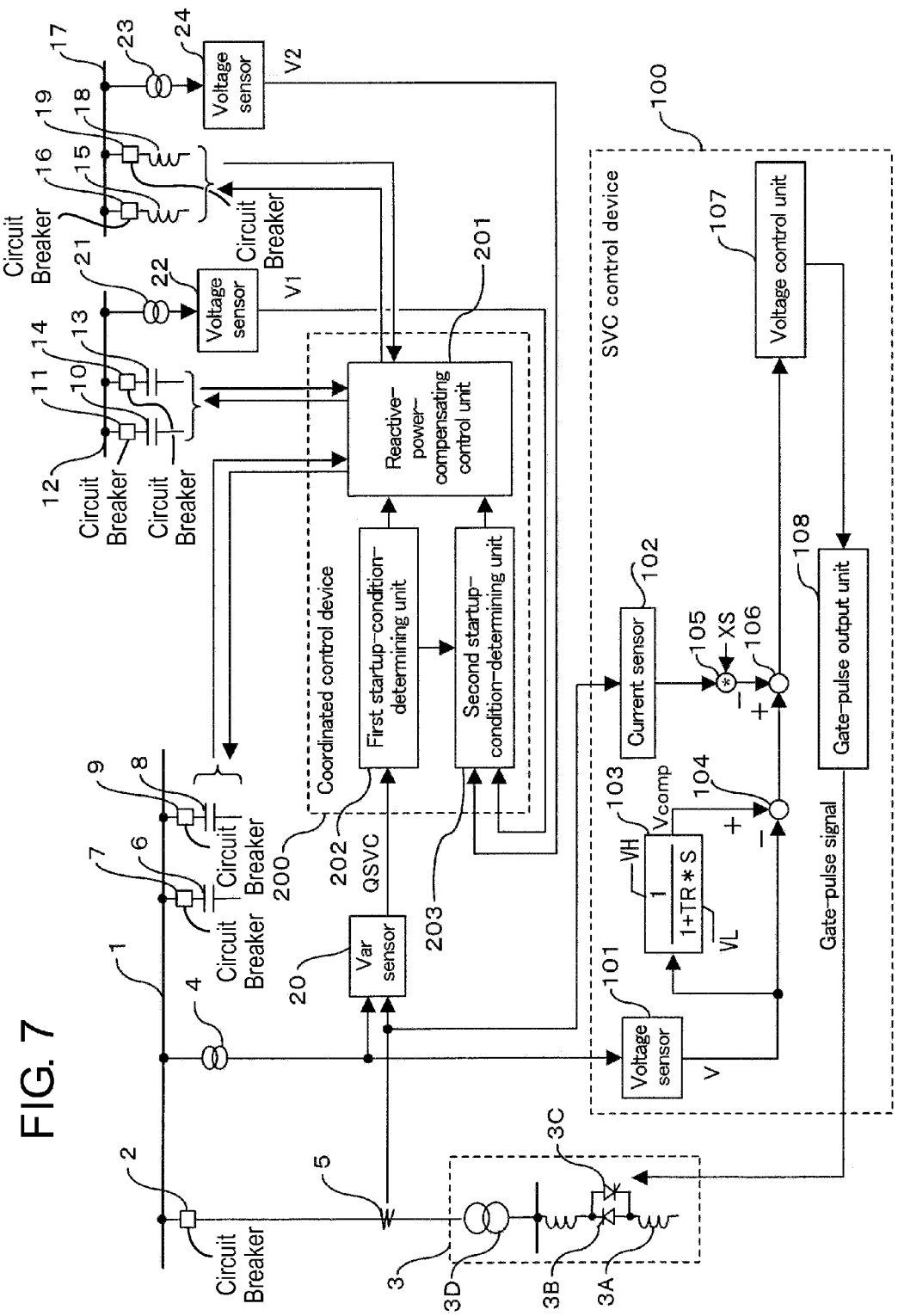
FIG. 7 is a block diagram for explaining a configuration of a reactive-power control apparatus in Embodiment 3 of the present invention.

Embodiment 3 of the present invention relates to a case in which, after voltage control similar to that in Embodiment 2 has been carried out, in situations in which a voltage at a predetermined voltage-observation point has deviated from the predetermined limits, a reactive power compensation device is connected or disconnected so that voltage distribution over an overall power system, and distribution of reactive power that reactive power compensation devices generate are rearranged. In FIG. 7, a block diagram is shown for explaining a configuration of a reactive-power control apparatus in Embodiment 3. In FIG. 7, the same reference numerals and symbols designate the same items as or items corresponding to those in FIG. 5; thus, their explanation is omitted.

In FIG. 7, the busbar 12 and the busbar 17 are predetermined voltage observation points at which it is monitored whether or not each of the voltages is outside predetermined limits. A voltage transformer VT 21 and a voltage sensor 22 are installed at the busbar 12, and the voltage sensor 22 transmits an obtained voltage signal V1, to the coordinated control device 200. A voltage transformer VT 23 and a voltage sensor 24 are installed at the busbar 17, and the voltage sensor 24 transmits an obtained voltage signal V2, to the coordinated control device 200. The voltage observation points are so determined that appropriate points are selected to grasp a voltage distribution over the overall power system, and the number of points is predetermined.

In addition, the coordinated control device 200 further includes a second startup-condition-determining unit 203. After a predetermined time passes since an operation of the corresponding reactive power compensation devices activated by the first startup-condition-determining unit 202 has been completed, the second startup-condition-determining unit 203 activates the reactive-power-compensating control unit 201 when a fluctuation of reactive-power QSVC in another latest predetermined time-interval (that is sufficiently larger than the time constant TR) is within predetermined limits, and at the same time, a voltage V1 or V2 deviates out of predetermined limits. Conditions for the voltages V1 and V2 are determined by equations similar to Equation (1) and Equation (2), using predetermined upper-limit voltage-values "VH1" and "VH2," and lower-limit voltage-values "VL1" and "VL2," respectively. The coordinated control device 200 that includes the second startup-condition-determining unit 203 operates as a first reactive-power-compensation device controller, as well as a second reactive-power-compensation device controller.

The reactive-power-compensating control unit 201 controls the reactive power compensation devices (including each selectable capacity, when applicable) as control targets so that all the voltages at the voltage observation points and the control target voltages are within the predetermined limits. Even when there exist points where their voltages can not be brought within the predetermined limits, the reactive-power-compensating control unit 201 controls the reactive power compensation devices so that there are a smaller number of points where each of their voltages is outside the limits, and the amount of each of their voltage deviations from the predetermined limits becomes small. Moreover, the reactive-power-compensating control unit 201 may control so that, without considering the number of points where each of their voltages is outside the limits, a maximum value of the voltage deviations from the predetermined limits is minimized, or a sum total of each amount of voltage deviations from the predetermined limits is minimized.

Furthermore, when a plurality of operation patterns exists for the control-target reactive power compensation devices, an operation pattern to be performed is selected, based on similar conditions described in Embodiment 2.

As described above, in Embodiment 3 of the present invention, in addition to the effects obtained in Embodiment 1 and Embodiment 2, there produced is an effect that voltage distribution in an overall power system becomes appropriate.

Embodiment 4

Figure 8:
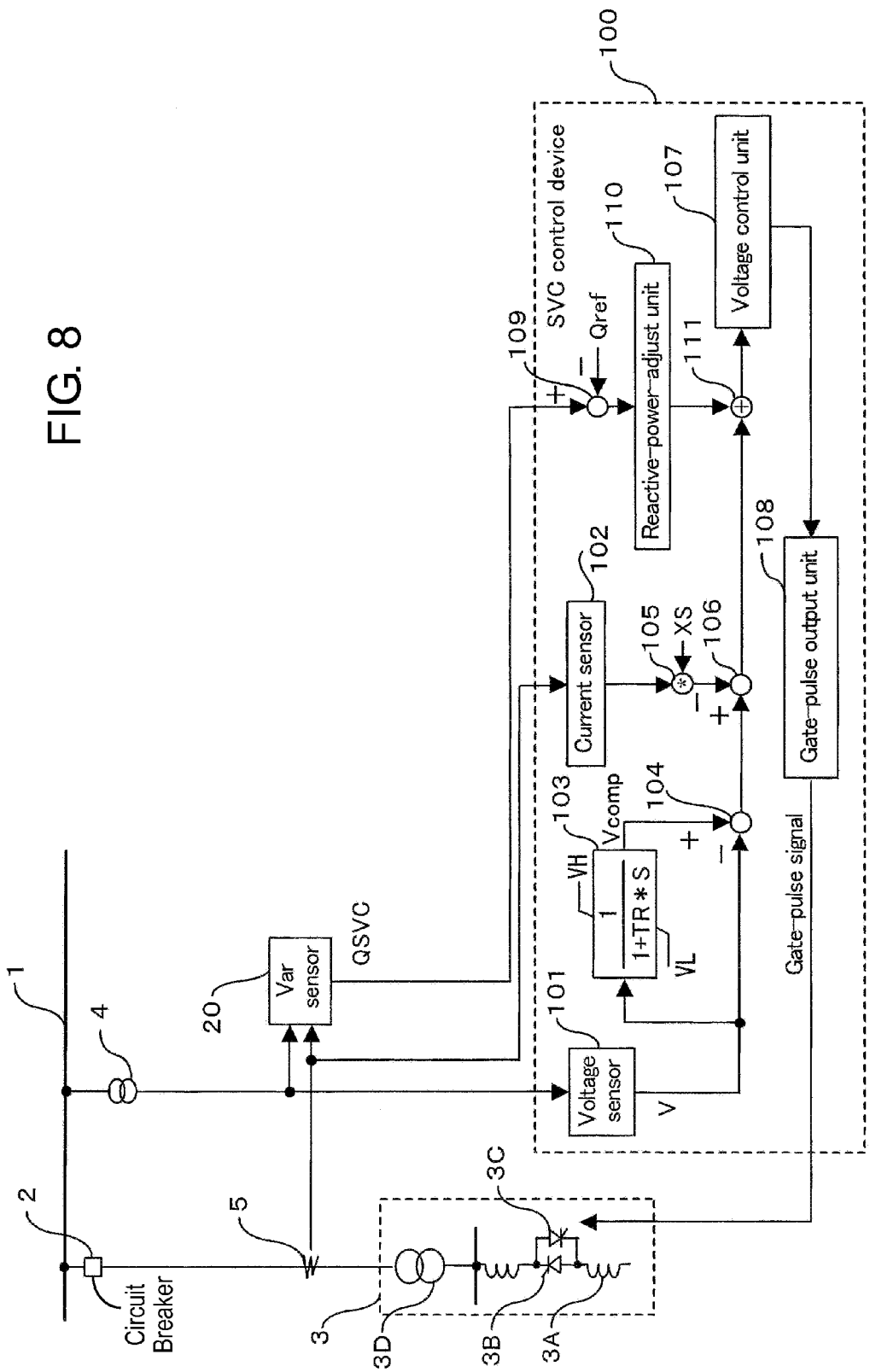
FIG. 8 is a block diagram for explaining a configuration of a reactive-power control apparatus in Embodiment 4 of the present invention.

Although in Embodiment 1, reactive-power QSVC the SVC 3 generates approaches zero as time passes, a modification is provided in Embodiment 4 of the present invention so that the reactive power approaches a predetermined value. In FIG. 8, a block diagram is shown for explaining a configuration of a reactive-power control apparatus in Embodiment 4. In FIG. 8, the same reference numerals and symbols designate the same items as or items corresponding to those in FIG. 1; thus, their explanation is omitted.

In FIG. 8, a voltage signal measured by the VT 4 and a current signal measured by the CT 5 are inputted into the VAr sensor 20 that is added to compute reactive-power QSVC the SVC 3 generates. An output from the VAr sensor 20 is inputted into the SVC control device 100, and an internal structure of the SVC control device 100 is modified. To the SVC control device 100, the following units are further added: a differentiator 109 that calculates the amount of difference between the output from the VAr sensor 20 and a predetermined value "Qref"; a reactive-power-adjust unit 110 into which an output from the differentiator 109 is inputted, and by which reactive-power QSVC the SVC 3 generates is controlled so that it becomes coincident with the predetermined value "Qref"; and an adder 111 that adds an output from the reactive-power-adjust unit 110 and an output from the differentiator 106. In addition, an output from the adder 111 is inputted into the voltage control unit 107. The differentiator 109 and the reactive-power-adjust unit 110 constitute an SVC-generated reactive-power coordinating unit.

The predetermined value "Qref" may be a value set by the SVC control device 100, or a command value transmitted from a load-dispatching center, an electric-utility control center, or the like commanding a part of or overall power system. In addition, the predetermined value "Qref" may be a value always kept as a constant, or a variable depending on a state of the power system in which the SVC 3 is installed. The predetermined value "Qref" may be set, for example, at an appropriate magnitude of lagging reactive power for the SVC 3 that is installed at a point where the voltage is likely to be dropped. In order not to allow the voltage dropping sharply, the predetermined value "Qref" is thus set to maximize leading reactive power the SVC 3 can instantaneously generate. In other way around, for the SVC 3 that is installed at a point where the voltage is likely to rise, in order not to allow the voltage rising sharply, the predetermined value "Qref" is set to maximize lagging reactive power the SVC 3 can instantaneously generate.

Figure 9:
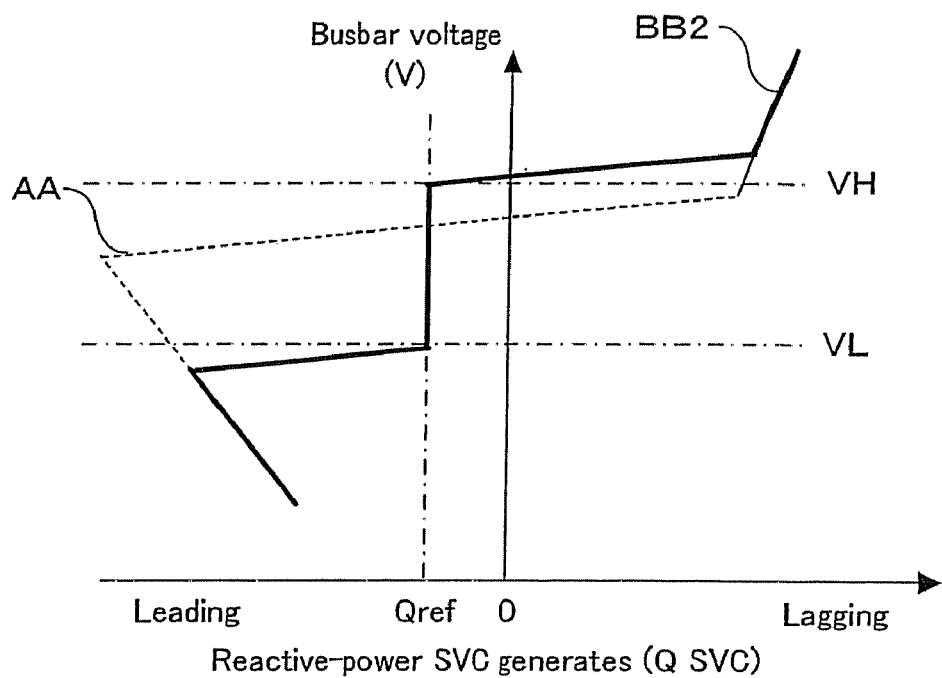
FIG. 9 is a diagram for explaining a relationship between a busbar voltage and reactive power generated by a busbar-connected SVC when the reactive-power control apparatus in Embodiment 4 of the present invention operates.

Next, the operations of the reactive-power control apparatus are explained. FIG. 9 is a diagram for explaining a relationship between a busbar voltage (V) and reactive power (QSVC) the busbar-connected SVC 3 generates when the reactive-power control apparatus in Embodiment 4 of the present invention operates. The dynamic characteristic line "AA" is similar to the one in FIG. 2 in Embodiment 1. In comparison with this, the steady-state characteristic line "BB2" differs from the foregoing steady-state characteristic line "BB" in that, when the busbar voltage V is kept within the limits "VH" and "VL," the reactive-power QSVC the SVC 3 generates is controlled so that its value becomes the predetermined one "Qref," as this is indicated as a shift from the origin "O" in FIG. 9. This is because, in a state when a differential voltage that is an output from the differentiator 104 is zero, the reactive-power-adjust unit 110 controls so that the reactive-power QSVC the SVC 3 generates coincides with the predetermined value "Qref."

In this way, in Embodiment 4 of the present invention, the SVC 3 can mitigate a steep voltage fluctuation by operating itself similarly to conventional one. At the same time, in a steady state, reactive power the SVC 3 generates can be adjusted to an appropriate value. Even when a disturbance or the like occurs in a power system and its voltage suddenly fluctuates, according to a point at which the SVC 3 is installed, and within appropriate limits, the SVC 3 is always able to operate, so that a steep voltage fluctuation can be mitigated.

Moreover, the predetermined value "Qref" may be set to zero; in that case, the reactive-power control apparatus in Embodiment 4 operates similarly to the one in Embodiment 1, thus similar effects can be obtained.

Embodiment 5

Figure 10:
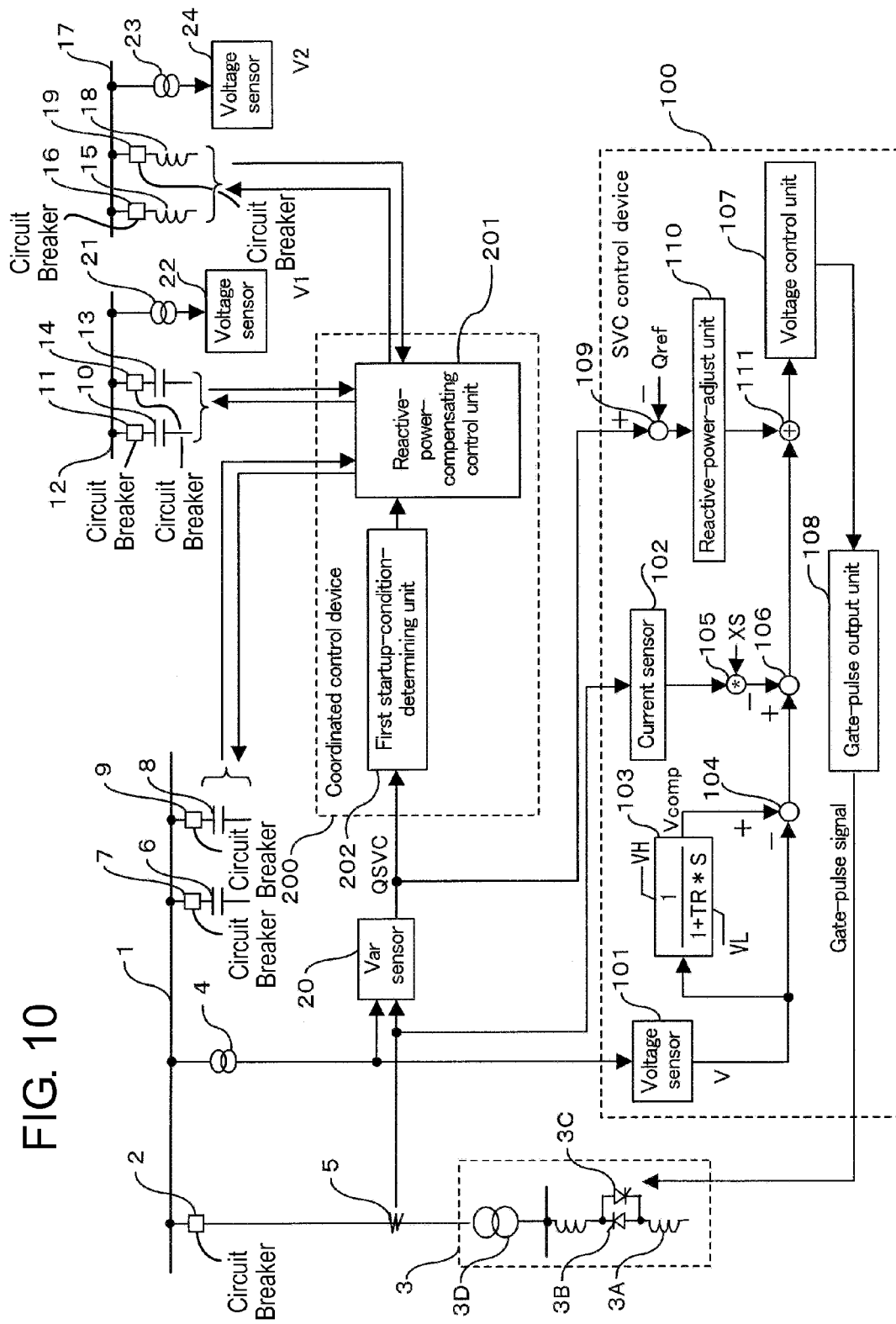
FIG. 10 is a block diagram for explaining a configuration of a reactive-power control apparatus in Embodiment 5 of the present invention.

In Embodiment 5 of the present invention, a modification similar to Embodiment 4 is additionally carried out to Embodiment 2. In FIG. 10, a block diagram is shown for explaining a configuration of a reactive-power control apparatus in Embodiment 5.

Embodiment 5 produces effects in which the effects obtained in Embodiment 2 and Embodiment 4 have been combined together.

Embodiment 6

Figure 11:
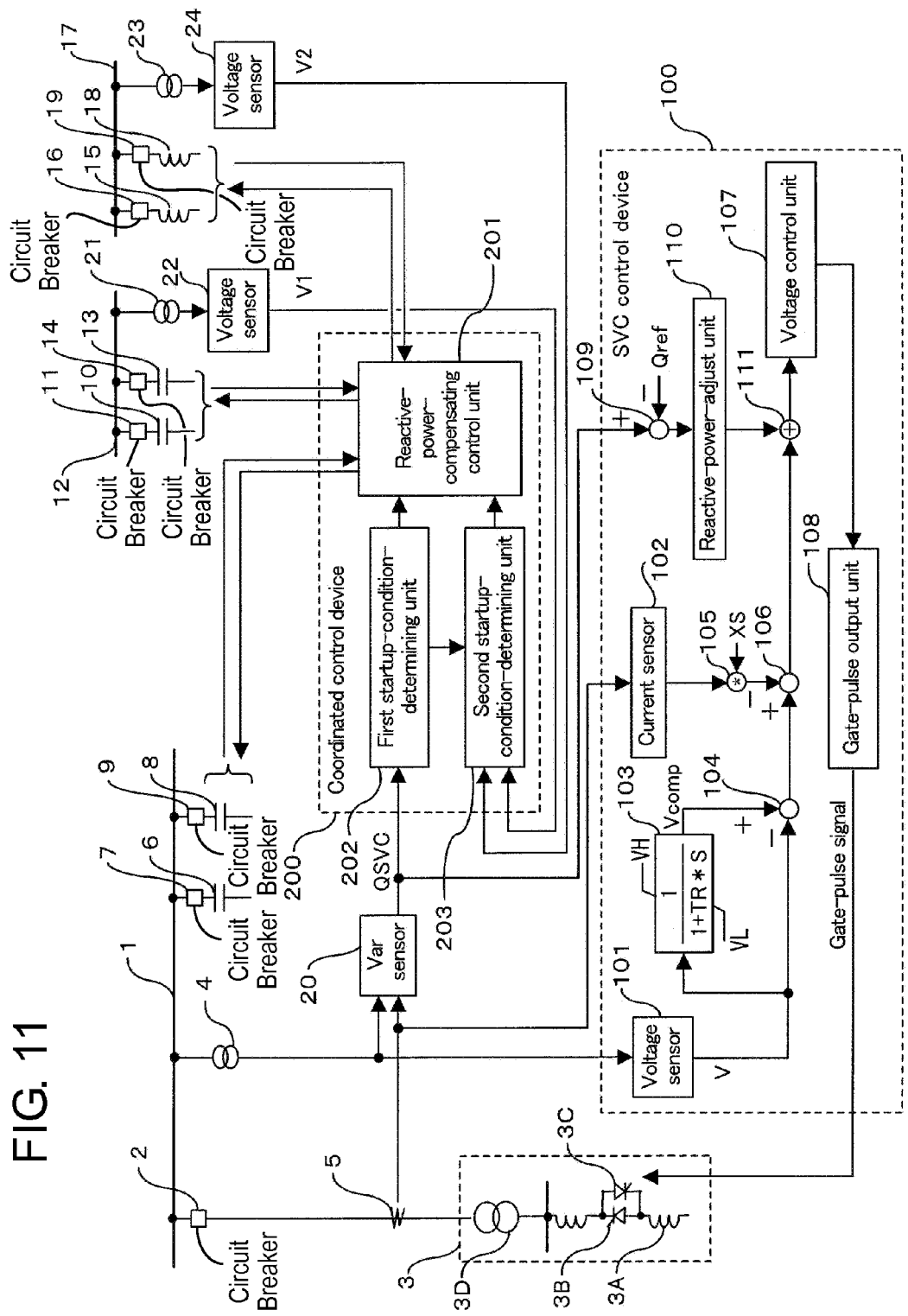
FIG. 11 is a block diagram for explaining a configuration of a reactive-power control apparatus in Embodiment 6 of the present invention.

In Embodiment 6 of the present invention, a modification similar to Embodiment 4 is additionally carried out to Embodiment 3. In FIG. 11, a block diagram is shown for explaining a configuration of a reactive-power control apparatus in Embodiment 6.

Embodiment 6 produces effects in which the effects obtained in Embodiment 3 and Embodiment 4 have been combined together.

While the present invention has been shown and described in detail, the foregoing description is in all aspects illustrative and not restrictive. It is therefore understood that numerous modifications and variations can be realized without departing from the scope of the invention.

What is claimed is:

1. A reactive-power control apparatus, comprising:
   a comparison voltage generator for generating, for a control target voltage as a target, to mitigate voltage fluctuation, a comparison voltage restricted within predetermined limits and obeying a predetermined time-lag characteristic;
   a differential voltage generator for generating a differential voltage that is the difference between the comparison voltage and the control target voltage; and
   a reactive-power control device for controlling, in response to the differential voltage, control-target reactive power generated by a static reactive-power compensator, at a time-related characteristic faster than the time-lag characteristic for the comparison voltage.

2. The reactive-power control apparatus according to claim 1, further comprising:
   a first reactive-power-compensation device controller for controlling operation of a reactive power compensation device as a control target, in situations in which the reactive-power control device is not operating and in which reactive power generated by the static reactive-power compensator has deviated from the predetermined limits, so as to bring the reactive power generated by the static reactive-power compensator within the predetermined limits.

3. The reactive-power control apparatus according to claim 2, further comprising:
   a second reactive-power-compensation device controller for controlling operation of a reactive power compensation device as a control target, in situations in which the reactive-power control device and the first reactive-power-compensation device controller are not operating and in which a voltage at a predetermined voltage-observation point has deviated from the predetermined limits, so as to bring the voltage within the predetermined limits.

4. The reactive-power control apparatus according to claim 1, further comprising:
   a static-VAr-compensator-generated reactive-power coordinating unit for setting reactive power generated by the static reactive-power compensator to a predetermined value, in situations in which the differential voltage is smaller than a predetermined value and in which the control target voltage is within the predetermined limits.

5. A reactive-power compensator, comprising:
   a static reactive-power compensator, connected to a busbar, for generating reactive power in response to voltage fluctuation at the busbar;
   a comparison voltage generator for generating, for the voltage at the busbar as a control target voltage, a comparison voltage restricted within predetermined limits and obeying a predetermined time-lag characteristic;

a differential voltage generator for generating a differential voltage that is the difference between the comparison voltage and the control target voltage; and a reactive-power control device for controlling, in response to the differential voltage, reactive power generated by said static reactive-power compensator, at a time-related characteristic faster than the time-lag characteristic for the comparison voltage.

6. The reactive-power compensator according to claim 5, further comprising:

a first reactive-power-compensation device controller for controlling operation of a reactive power compensation device as a control target, in situations in which the reactive-power control device is not operating and in which reactive power generated by the static reactive-power compensator has deviated from the predetermined limits, so as to bring the reactive power generated by the static reactive-power compensator within the predetermined limits.

7. The reactive-power compensator according to claim 6, further comprising:

a second reactive-power-compensation device controller for controlling operation of a reactive power compensation device as a control target, in situations in which the reactive-power control device and the first reactive-power-compensation device controller are not operating and in which a voltage at a predetermined voltage-observation point has deviated from the predetermined limits, so as to bring the voltage within the predetermined limits.

8. The reactive-power compensator according to claim 5, further comprising:

a static-VAr-compensator-generated reactive-power coordinating unit for setting reactive power generated by the static reactive-power compensator to a predetermined value, in situations in which the differential voltage is smaller than a predetermined value and in which the control target voltage is within the predetermined limits.

* * * * *